United States Patent
Huang

[19]
[11] Patent Number: 5,845,925
[45] Date of Patent: Dec. 8, 1998

[54] SAFETY DEVICE FOR A STROLLER

[76] Inventor: Ming-tai Huang, 4Fl., No. 302, Sec. 7, Chengteh Rd., Taipei, Taiwan

[21] Appl. No.: 790,243

[22] Filed: Jan. 28, 1997

[51] Int. Cl.$^6$ ............................... B62B 7/06; F16D 3/00
[52] U.S. Cl. ........................ 280/642; 280/649; 403/93
[58] Field of Search ........................... 280/642, 644, 280/646, 647, 649, 650, 657, 658, 42; 403/93, 96, 92

[56] References Cited

U.S. PATENT DOCUMENTS

| | | | |
|---|---|---|---|
| 4,479,665 | 10/1984 | Kassai | 280/644 |
| 4,632,421 | 12/1986 | Shamie | 280/642 |
| 5,028,061 | 7/1991 | Hawkes | 280/47.4 |
| 5,039,118 | 8/1991 | Huang | 280/47.371 |
| 5,056,805 | 10/1991 | Wang | 280/47.36 |
| 5,062,179 | 11/1991 | Huang | 16/111 R |
| 5,069,474 | 12/1991 | Tai | 280/658 |
| 5,240,265 | 8/1993 | Huang | 280/47.4 |
| 5,244,228 | 9/1993 | Chiu | 280/642 |
| 5,334,354 | 8/1994 | Johnston et al. | 422/104 |
| 5,472,224 | 12/1995 | Cabagnero | 280/642 |
| 5,524,503 | 6/1996 | Ishikura | 74/501.6 |
| 5,620,272 | 4/1997 | Sheng | 403/96 |

*Primary Examiner*—Brian L. Johnson
*Assistant Examiner*—Bridget Avery
*Attorney, Agent, or Firm*—Kirkpatrick & Lockhart LLP

[57] ABSTRACT

A safety device for a stroller includes a first member with a first disk and a second disk which is pivotally connected to the first disk of the first member. The first member is connected to a segment of the stroller and the second disk has a connecting bar connected to another segment of the stroller. A torsion spring is disposed between the first member and the second disk with one end of the torsion spring connected to the first member and the other end of the torsion spring connected to the second disk. The first member has a first protrusion extending laterally from the first disk, the second disk having a second recess defined therein so as to receive the first protrusion therein. The first member has an extending portion extending laterally therefrom which has a first recess defined therein so as to receive a second protrusion extending radially from the second disk therein. A lever extends from the extending portion and has a stop extending laterally therefrom such that when the stroller is to be folded, the second protrusion passes the stop by pushing the lever and the torsion spring facilitates easy folding of the stroller.

1 Claim, 5 Drawing Sheets

5,845,925

SAFETY DEVICE FOR A STROLLER

BACKGROUND OF THE INVENTION

1. Field of the Invention

The present invention relates to a safety device and, more particularly, to an improved safety device for a stroller so as to both prevent the stroller from folding unintentionally and facilitate folding actions of the stroller.

2. Brief Description of the Prior Art

Safety devices are disposed to strollers so that when an accidental impact occurs to a folding device of a stroller, the stroller will not fold suddenly and this provides safety for users. U.S. Pat. No. 5,226,658, "Position-retaining Bar for A Toy Stroller" owned by Applicant has been developed and which provides a safety device for strollers. The safety device assists the users to cope with an accident situation as mentioned above, that is to say, the users have to operate at least two actions to fold the strollers completely. Although the safety device basically achieves the goal which effectively prevents the stroller from unintentionally folding, users need effort to complete the folding actions and this could be difficult for some users.

The present invention intends to provide an improved safety device having a spring member disposed therein so as to facilitate a folding action for the users so as to mitigate and/or obviate the above-mentioned problems.

SUMMARY OF THE INVENTION

The present invention provides a safety device for a stroller and which comprises a first member having one end with a first disk formed thereto and the other end of the first member connected to a segment of the stroller. The first disk has a first central tube and a first rod respectively extending therefrom. A first protrusion extends radially from the first disk. The first member has an extending portion extending laterally therefrom which has a first recess defined therein which opens toward the first disk and a lever extends from the extending portion. A stop extends laterally from the lever.

A second disk has a connecting bar and a second protrusion respectively and diametrically extending therefrom, a second central tube and two second rods respectively extending laterally from the second disk. The connecting bar is connected to another segment of the stroller and has a second recess defined therein so as to receive the first protrusion in the second recess. The first disk and the second disk are connected with each other by extending a first rivet through the first central tube and the second central tube and the second protrusion is received in the first recess.

A torsion spring is mounted to the first central tube and the second central tube and has one end thereof connected to the first rod and the other end of the coil spring is connected between the two second rods.

It is an object of the present invention to provide a safety device of a stroller and which has a torsion spring disposed thereto so as to facilitate folding action of the stroller.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
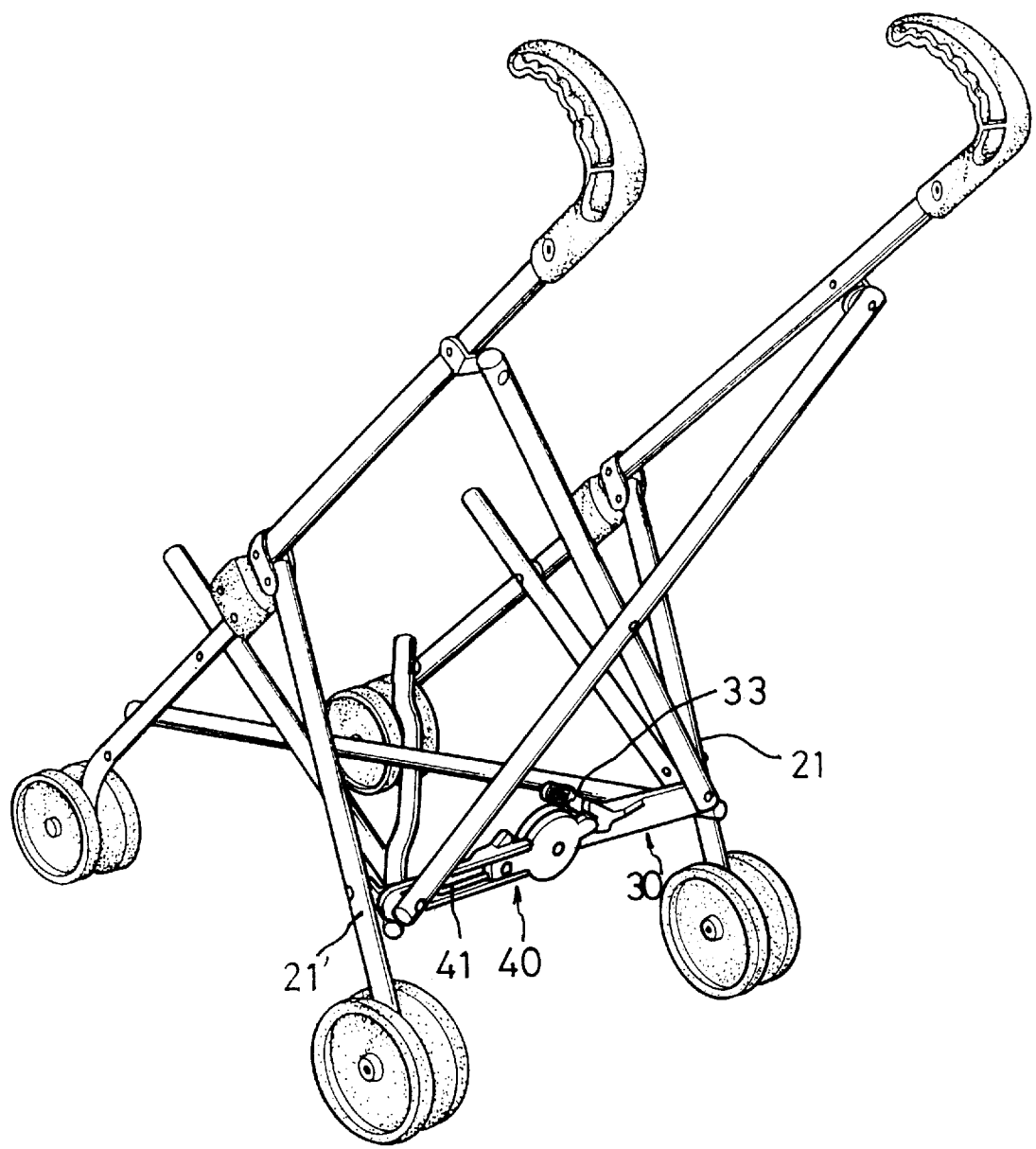
FIG. 1 is a perspective view of a stroller which has a safety device in accordance with the present invention disposed thereto.
Figure 2:
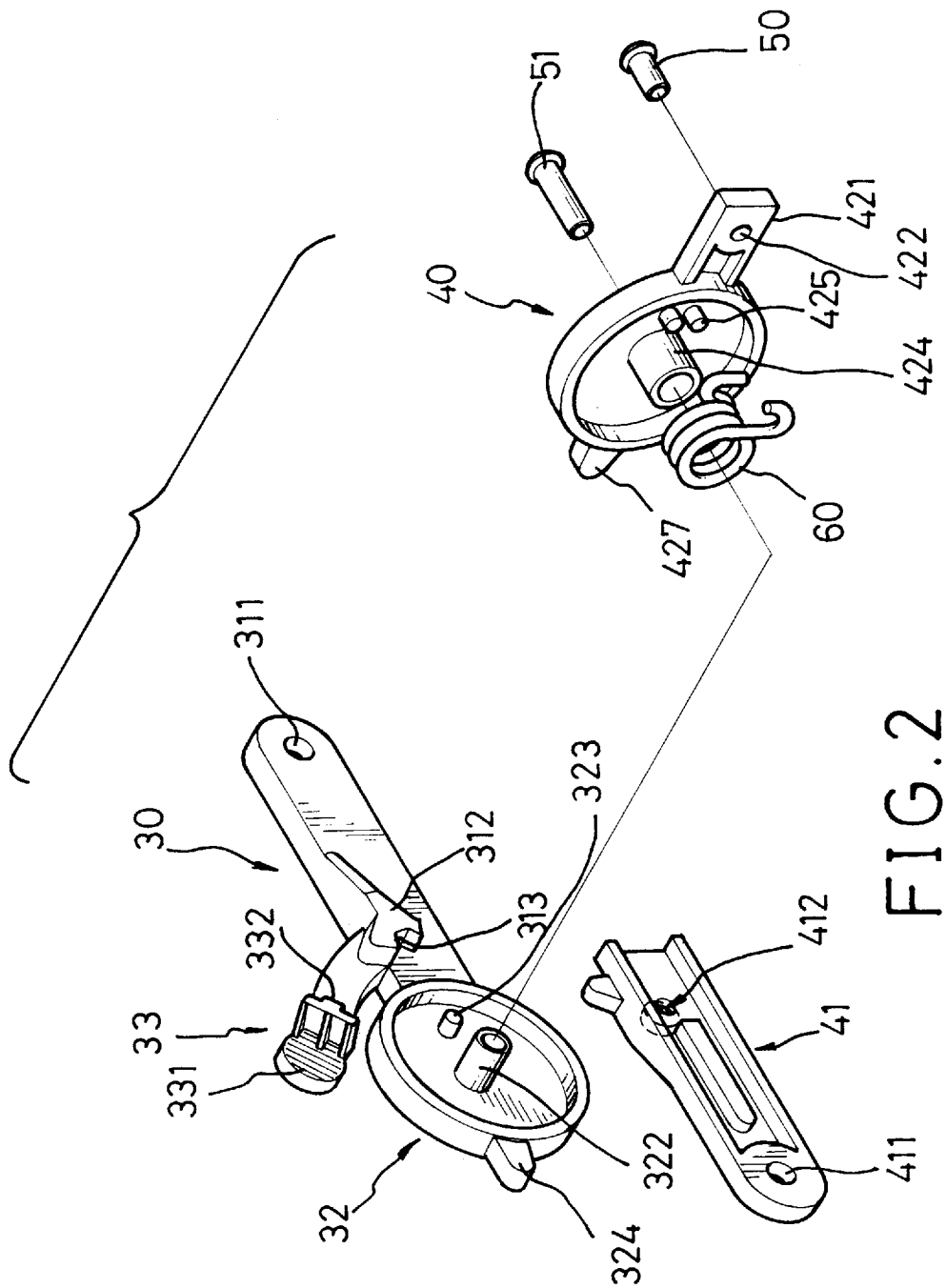
FIG. 2 is an exploded view of the safety device in accordance with the present invention.
Figure 3:
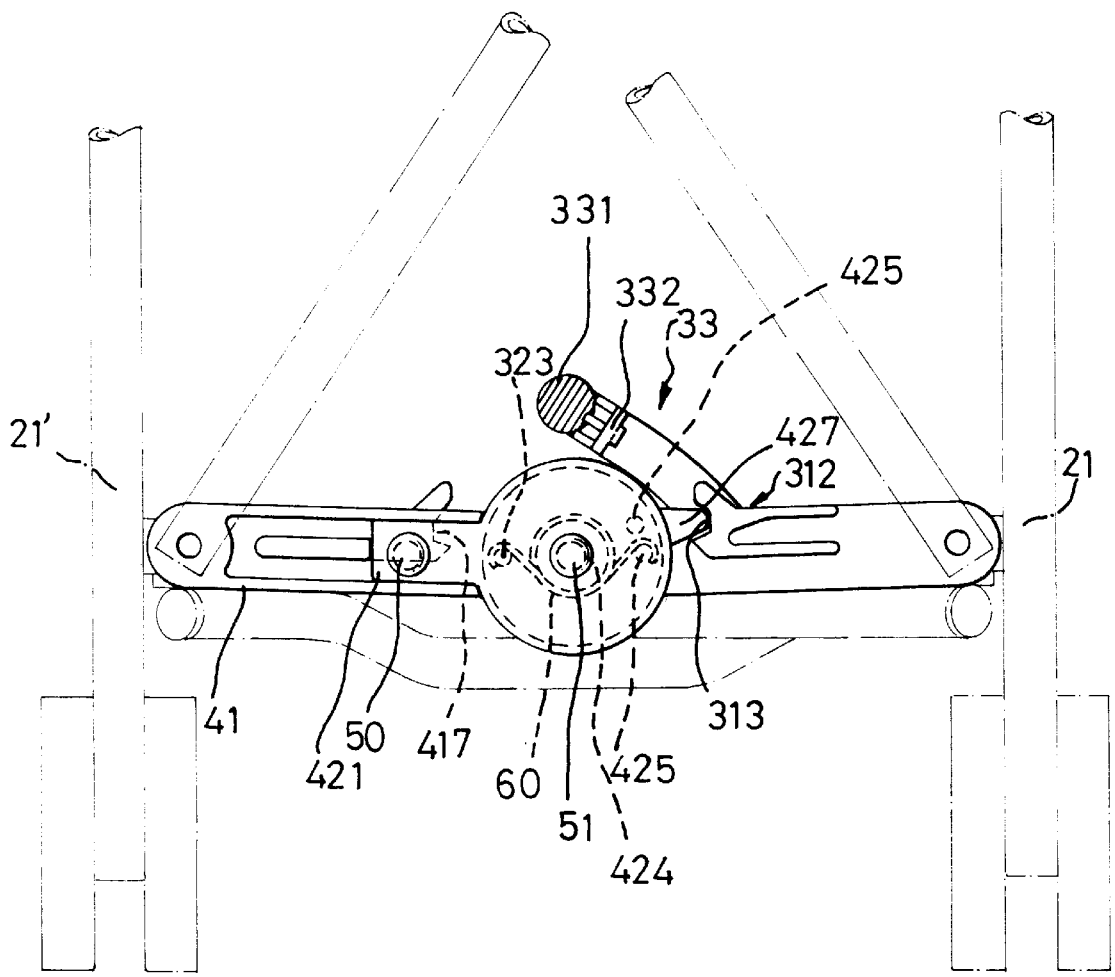
FIG. 3 is an illustrative view to show the safety device when the stroller is unfolded.
Figure 4:
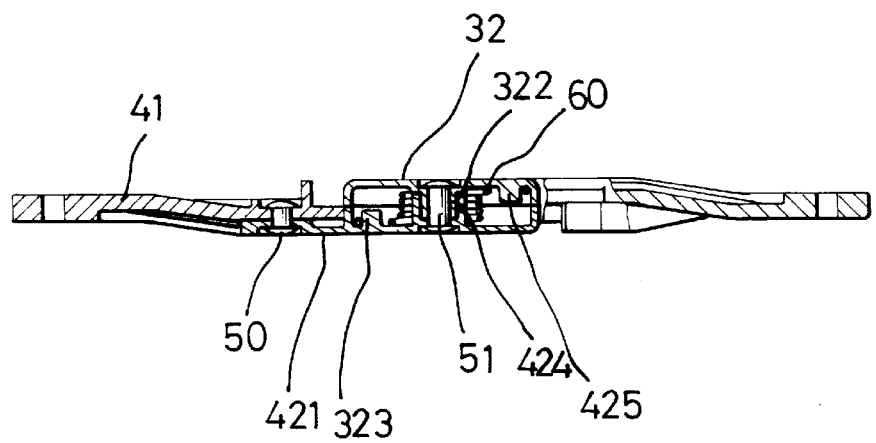
FIG. 4 is a top plan view, partly in section, of the safety device.

Referring to the drawings and initially to FIGS. 1 through 4, a safety device in accordance with the present invention generally includes a first member 30 having one end with a first disk 32 formed thereto and the other end of the first member 30 having a first hole 311 defined therethrough for attachment to a segment 21 (FIG. 3) of the stroller, the first disk 32 having a first central tube 322 and a first rod 323 respectively extending from one of two sides thereof. The first disk 32 has a first protrusion 324 extending radially therefrom. The first member 30 has an extending portion 312 extending laterally therefrom which has a first recess 313 defined therein and the first recess 313 opens toward the first disk 32. A lever 33 extends from the extending portion 312 and has a stop 332 extending laterally from the lever 33, and a pushing portion 331 defined laterally in the lever 33 and located above the stop 332. The lever 33 is made of a resilient material so that when a user (not shown) pushes the pushing portion 331, the lever 33 together with the stop 332 are pushed toward a direction opposite the extending portion 312.

A second disk 40 has a first connecting bar 421 and a second protrusion 427 respectively and diametrically extending therefrom. A second central tube 424 and two second rods 425 respectively extend laterally from one of two sides of the second disk 40. The first connecting bar 421 has a second hole 422 defined therethrough. The first disk 32 and the second disk 40 are mounted by inserting the first central tube 322 through the second central tube 424 and which are connected with each other by a first rivet 51 wherein the first rod 323 is located diametriccally opposite the two second rods 425 and the second protrusion 427 is received in the first recess 313.

A torsion spring 60 is mounted to the first central tube 322 and the second central tube 424 and has one of two ends thereof connected to the first rod 323 and the other end of the torsion spring 60 connected between the two second rods 425 such that the torsion spring 60 tends to force the first member 30 toward the first connecting bar 421 when the second protrusion 427 is received in the first recess 313.

A second connecting bar 41 having one end thereof with a fourth hole 412 defined therethrough by which the second connecting bar 41 is connected to the first connecting bar 421 with a second rivet 50 extending through the second hole 421 and the fourth hole 412. The other end (free end) of the second connecting bar 41 has a third hole 411 defined therethrough for attachment to another segment 21' (FIG. 3) of the stroller. A second recess 417 (FIG. 3) is defined therein so as to receive the first protrusion 324 therein.

Accordingly, when the stroller is unfolded, the first protrusion 324 is received in the second recess 417 and the second protrusion 427 is received in the first recess 313.

Figure 6:
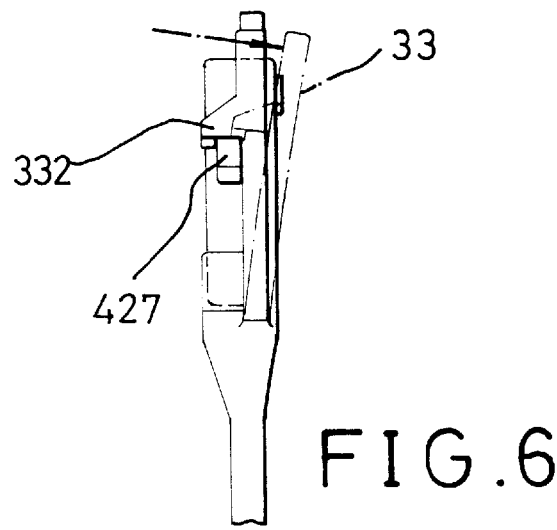
FIG. 6 is an illustrative view to show the second protrusion passes the stop by pushing the lever aside.
Figure 5:
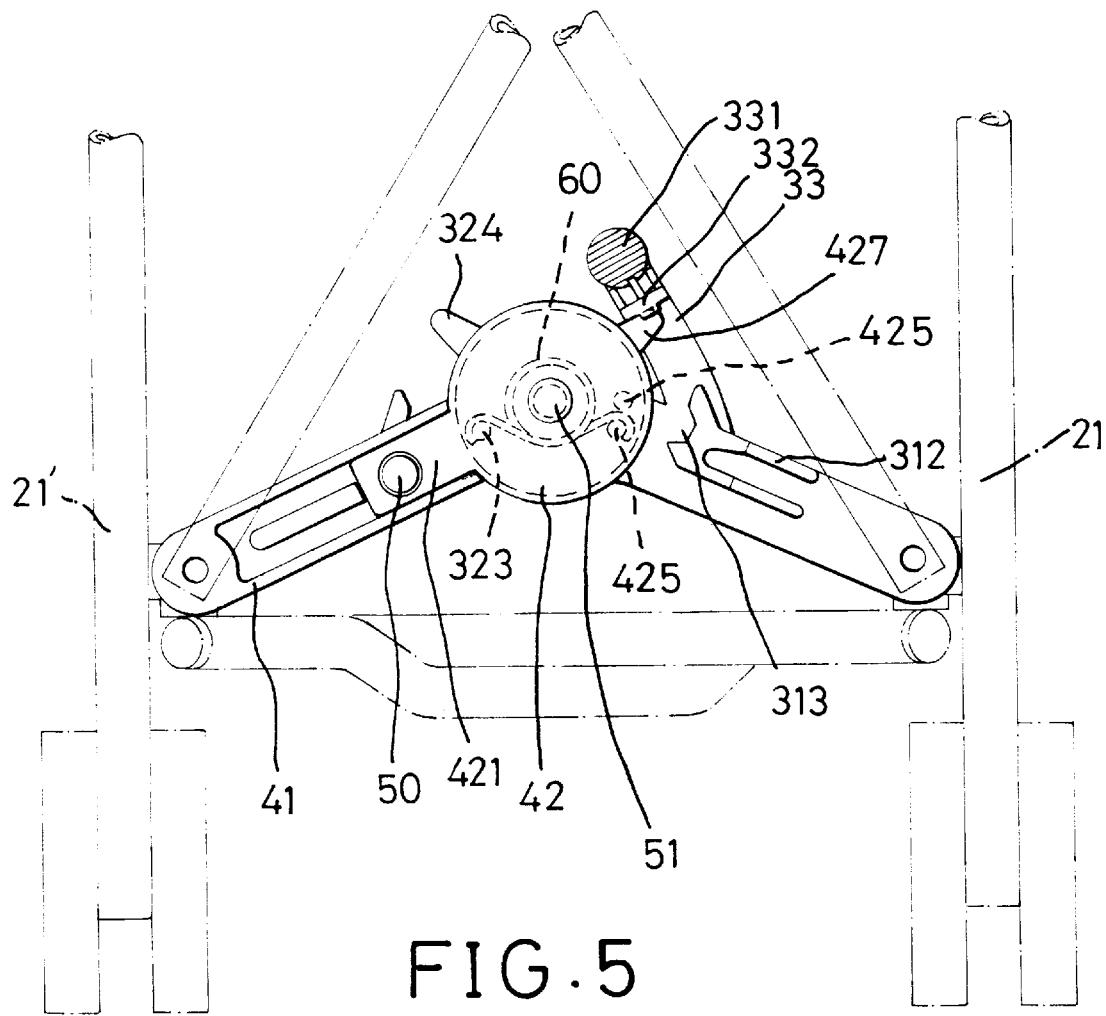
FIG. 5 is an illustrative view to show when the stroller has folded unintentionally, a second protrusion is stopped by the stop of a lever.
Figure 7:
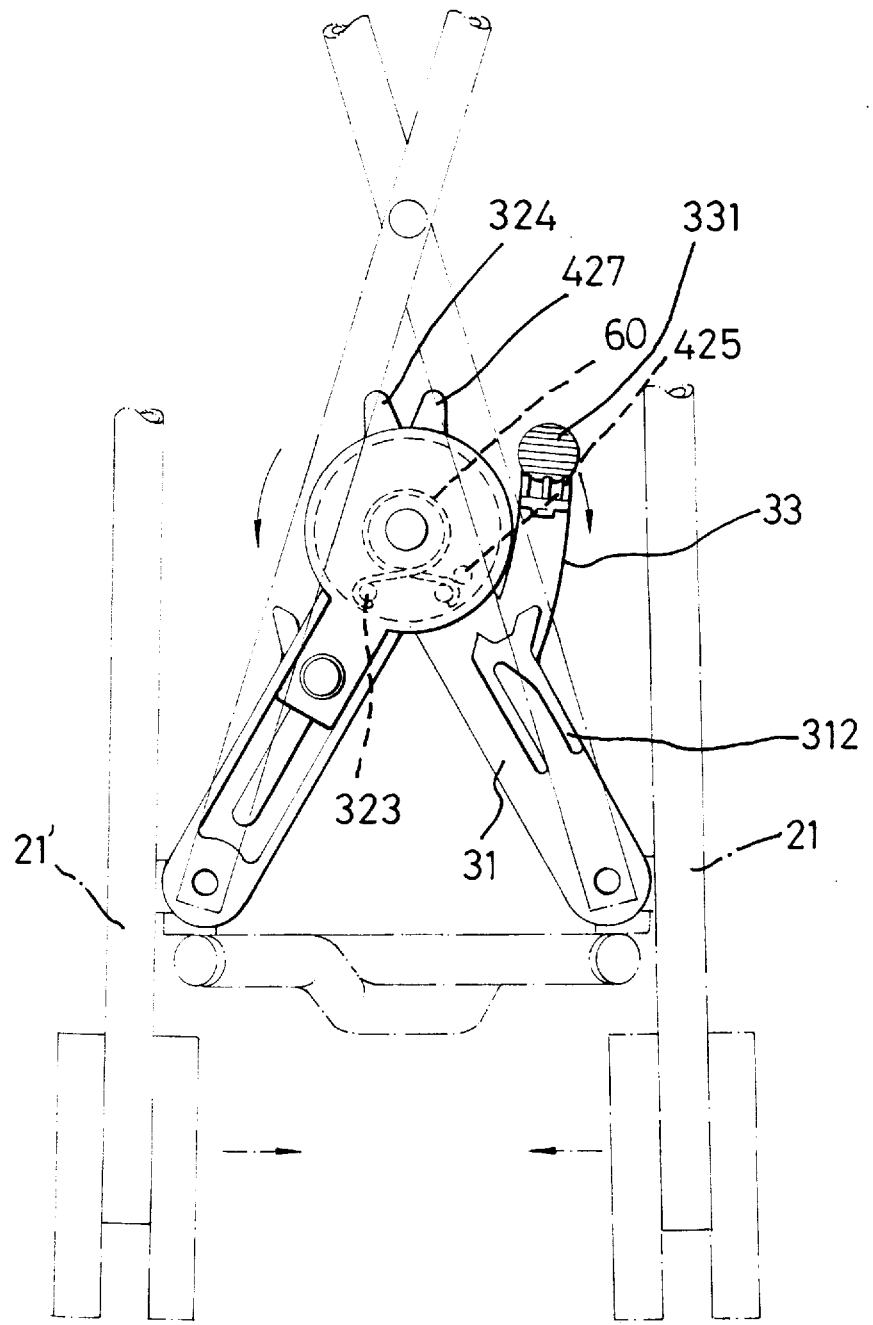
FIG. 7 is an illustrative view to show when the lever is pushed aside, a coil spring in the safety device facilitate the folding action of the stroller.

Referring to FIG. 5, if the stroller begins to fold unintentionally, the first protrusion 324 and the second protrusion 427 are respectively disengaged from the second recess 417 and the first recess 313, the first member 30 and the second connecting bar 41 are pivoted about the first rivet 51 by the torsion spring 60. The second protrusion 427 is stopped by the stop 332 of the lever 33 so as to prevent the stroller from suddenly folding completely. When the user wants to fold the stroller completely, he/she has to push the pushing portion 331 of the lever 33 as shown in FIG. 6 to push the stop 332 away from the second protrusion 427 such that the first member 30 and the second disk 40 together with the second connecting bar 41 are easily folded by a force of the torsion spring 60 (FIG. 7) such that the user can fold the stroller quickly and easily which is particularly advantageous.

Although the invention has been explained in relation to its preferred embodiment, it is to be understood that many other possible modifications and variations can be made without departing from the spirit and scope of the invention as hereinafter claimed.

What is claimed is:

1. A safety device for a stroller comprising:

a first member (30) having one end with a first disk (32) formed thereto and the other end of said first member (30) having a first hole (311) defined therethrough for attachment to a segment of said stroller, said first disk (32) having a first central tube (322) and a first rod (323) respectively extending therefrom, said first disk (32) having a first protrusion (324) extending radially therefrom opposite to said first hole (311), said first member (30) having an extending portion (312) extending laterally therefrom which has a first recess (313) defined therein which opens toward said first disk (32), a lever (33) extending from said extending portion (312) and a stop (322) extending laterally from said lever (33);

a second disk (40) having a connecting bar (41) and a second protrusion (427) respectively and diametrically extending therefrom, a second central tube (424) and two second rods (425) respectively extending laterally from said second disk (40), said connecting bar (41) having a free end thereof connected to another segment of said stroller and a second recess (417) defined in said connecting bar (41) opposite to said free end so as to receive said first protrusion (324) in said second recess (417), said first disk (32) and said second disk (40) connected with each other by extending a first rivet (51) through said first central tube (322) and said second central tube (424) and said second protrusion (427) being received in said first recess (313), and a torsion spring (60) mounted to said first central tube (322) and said second central tube (424), said torsion spring (60) having one end thereof connected to said first rod (323) and the other end of said torsion spring (60) connected between said two second rods (425).

* * * * *